(12) United States Patent
Le-Nindre et al.

(10) Patent No.: US 12,079,538 B2
(45) Date of Patent: Sep. 3, 2024

(54) METHOD FOR DELIVERING PERSONALISED AUDIO CONTENT IN A VEHICLE CAB

(71) Applicant: Renault s.a.s., Boulogne-Billancourt (FR)

(72) Inventors: Benedicte Le-Nindre, Chateaufort (FR); Laurent Worms, Versailles (FR)

(73) Assignee: Renault s.a.s., Boulogne-Billancourt (FR)

( * ) Notice: Subject to any disclaimer, the term of this patent is extended or adjusted under 35 U.S.C. 154(b) by 173 days.

(21) Appl. No.: 17/628,121

(22) PCT Filed: May 15, 2020

(86) PCT No.: PCT/EP2020/063678
§ 371 (c)(1),
(2) Date: Jan. 18, 2022

(87) PCT Pub. No.: WO2021/013402
PCT Pub. Date: Jan. 28, 2021

(65) Prior Publication Data
US 2022/0276827 A1    Sep. 1, 2022

(30) Foreign Application Priority Data
Jul. 19, 2019 (FR) .................... 19 08199

(51) Int. Cl.
*G06F 3/16* (2006.01)
*H04R 3/00* (2006.01)
*G01C 21/34* (2006.01)

(52) U.S. Cl.
CPC ............ *G06F 3/165* (2013.01); *H04R 3/00* (2013.01); *G01C 21/3476* (2013.01); *H04R 2499/13* (2013.01)

(58) Field of Classification Search
CPC ........ H04R 2499/13; H04R 3/00; G06F 3/165
USPC .............................. 381/306, 86, 56
See application file for complete search history.

(56) References Cited

U.S. PATENT DOCUMENTS

| | | | |
|---|---|---|---|
| 9,319,019 B2* | 4/2016 | Selig | H03G 5/165 |
| 9,364,669 B2* | 6/2016 | Kehtarnavaz | A61N 1/0541 |
| 10,481,858 B2* | 11/2019 | Boulanger | H04H 60/16 |
| 10,524,053 B1* | 12/2019 | Moore | H04R 1/403 |
| 11,012,780 B2* | 5/2021 | Freeman | H04R 5/04 |
| 11,016,787 B2* | 5/2021 | Huang | H04N 7/188 |

(Continued)

OTHER PUBLICATIONS

International Search Report issued on Jul. 15, 2020 in PCT/EP2020/063678 filed on May 15, 2020, 2 pages.

*Primary Examiner* — Disler Paul
(74) *Attorney, Agent, or Firm* — Oblon, McClelland, Maier & Neustadt, L.L.P.

(57) ABSTRACT

A method delivers personalised audio content in a vehicle including a computer. The method including the following: configuring, in which the computer sends configuration parameters to an artificial intelligence module; processing, in which the artificial intelligence module sends a request for personalised audio content to a compiler based on the configuration parameters; generating audio content, in which the compiler queries an audio content provider to retrieve audio content to generate personalised audio content; and delivering audio content, in which the compiler sends the personalised audio content to the computer for broadcasting.

14 Claims, 1 Drawing Sheet

(56) References Cited

U.S. PATENT DOCUMENTS

| | | | |
|---|---|---|---|
| 11,182,447 B2* | 11/2021 | Childs | G06N 20/00 |
| 11,543,258 B2* | 1/2023 | Kong | G01C 21/3652 |
| 2016/0210670 A9 | 7/2016 | Bennett | |
| 2017/0255966 A1 | 9/2017 | Khoury | |
| 2018/0130095 A1 | 5/2018 | Khoury | |
| 2018/0328754 A1 | 11/2018 | Bofferding et al. | |
| 2018/0328755 A1 | 11/2018 | Bofferding et al. | |
| 2022/0207081 A1* | 6/2022 | Ding | G06V 20/56 |

* cited by examiner

METHOD FOR DELIVERING PERSONALISED AUDIO CONTENT IN A VEHICLE CAB

The invention relates to the field of the personalization of the ambiance in a vehicle.

The invention relates to a method for delivering personalized audio content in a vehicle cab.

The broadcast of audio contents within a vehicle cab according to the location of the vehicle or to the destination of the vehicle is known from the prior art. For example, when the vehicle is passing through a geographic area, an extract of a song whose lyrics relate in some way to said geographic area is broadcast within the cab of the vehicle. According to another example, a singer is known for his/her attachment to a region of France. When the destination of the vehicle is this region of France, one or more songs from this singer are played within the cab of the vehicle.

The prior art provides an audio broadcast experience in relation with the journey of the vehicle, but neither very personalized with respect to the occupants of the vehicle, nor sufficiently porous with respect to the external environment, not making it very unique.

The aim of this invention is to provide a unique, dynamic and contextual audio broadcast experience, which is porous with respect to the external environment, within a vehicle cab.

The invention relates to a method for delivering personalized audio content in a vehicle cab to a passenger, the vehicle comprising a computer, the method comprising the following steps:
- a configuration step, in which the computer sends configuration parameters to an artificial intelligence module, the configuration parameters comprising vehicle data, passenger data and contextual data,
- a processing step, in which the artificial intelligence module sends to a compiler a request to personalize audio content on the basis of at least one configuration parameter, the request for personalized audio content comprising at least one category of audio content,
- a step for generating audio content, in which the compiler interrogates an audio content supplier in order to obtain an audio content allowing personalized audio content to be generated in accordance with the request for personalized audio content,
- a step for delivering audio content, in which the compiler sends the personalized audio content to the computer for broadcasting said personalized audio content within the cab of the vehicle.

According to one aspect of the invention, the contextual data comprise geographical points of interest, the artificial intelligence module being capable of interrogating a server of a point of interest in order to obtain information on the point of interest, so as to generate the request for personalized audio content related to said information on the point of interest.

According to one aspect of the invention, the contextual data comprise geographical points of interest, the compiler being capable of mixing an extract of an audio content evoking a point of interest, or of mixing said audio content in its entirety with another audio content, so as to generate an audio content said to be of the enhanced type with a view to sending it as personalized audio content to the computer.

According to one aspect of the invention, the artificial intelligence module comprises parameters identifying a brand, a product or a company, the artificial intelligence module being capable of generating the request for personalized audio content, in phase with an identity of the brand, of the product or of the company, according to the identifying parameters.

According to one aspect of the invention, the method furthermore comprises a step for receiving a specific broadcast request, in which the artificial intelligence module receives a request for broadcasting a specific audio content, according to which method, in the processing step, the artificial intelligence module sends to the compiler the request for personalized audio content, furthermore depending on the specific broadcast request.

According to one aspect of the invention, the compiler is capable of interrogating one or more audio content suppliers in order to obtain several audio contents, the compiler being capable of generating the personalized audio content by mixing or concatenating several audio contents.

According to one aspect of the invention, the compiler is capable of generating a succession of audio contents personalized in accordance with the request for personalized audio content, starting from a plurality of audio contents generated in particular according to a nearest-neighbor search method, until it receives a new request for personalized audio content.

According to one aspect of the invention, the computer is capable of analyzing the personalized audio content in order to generate broadcast parameters, the broadcast parameters comprising one or more from, amongst other things, a correction of the audio timber, a sound spatialization, a dynamic audio compression, the broadcast of the personalized audio content within the cab of the vehicle being carried out according to said broadcast parameters.

The invention also relates to a computer program product comprising the programming instructions implementing the steps of the personalized information broadcast method, when the programming instructions are executed by a computer.

The invention also relates to a readable information medium on which the computer program product is stored.

The invention also relates to a system for delivering personalized audio content, in a vehicle cab, to a passenger comprising:
- a vehicle comprising a cab and a computer capable of sending configuration parameters comprising vehicle data, passenger data and contextual data, and capable of receiving personalized audio content for broadcasting said personalized audio content within the cab of the vehicle,
- an artificial intelligence module capable of receiving the configuration parameters and of sending a request for personalized audio content on the basis of at least one configuration parameter, the request for personalized audio content comprising at least one category of audio content,
- a compiler capable of receiving the request for personalized audio content and of interrogating an audio content supplier in order to obtain audio content allowing of generer the personalized audio content to be generated in accordance with the request for personalized audio content, the compiler being furthermore capable of sending the personalized audio content (29) to the computer.

Other advantages and features of the invention will become apparent upon reading the description and from the drawings.

Figure 1:
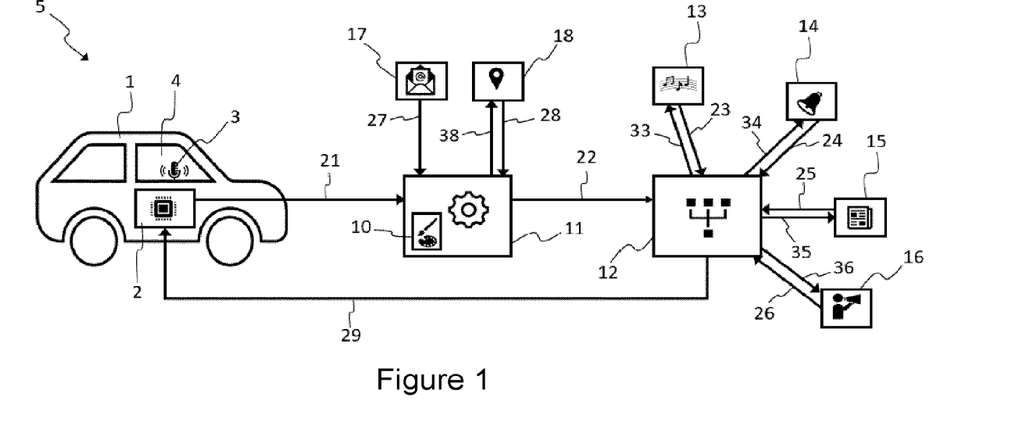
FIG. 1 shows a system allowing the implementation of a method for delivering personalized audio content according to the invention.

FIG. 1 shows an exemplary embodiment of a system 5 capable of executing the steps of the method of the invention, for delivering personalized audio content in a vehicle cab to a passenger. A passenger is a person located in the cab. The driver of the vehicle is a passenger in the sense of the invention. The cab is also commonly referred to as the passenger compartment of the vehicle.

The system 5 comprises a plurality of devices: a vehicle 1, an artificial intelligence module 11, a compiler 12, audio content suppliers 13, 14, 15, 16, a server 18 of a geographical point of interest, a connected electronic unit 17.

The vehicle 1 comprises a cab 4 designed to transport passengers. The vehicle 1 comprises a computer 2 and a loudspeaker 3 for broadcasting audio contents within the cab 4. A vehicle 1 generally comprises at least two loudspeakers 3.

The computer 2 is capable of sending configuration data 21 to the artificial intelligence module 11 and of receiving personalized audio content 29 for broadcasting within the cab 4.

Advantageously, the broadcast of personalized audio contents 29 may be disabled by a user of the vehicle for example via a human-machine interface. In this case, the computer 2 no longer sends any configuration data 21 to the artificial intelligence module 11.

Personalized audio content 29 may comprise metadata which the computer 2 is capable of decoding and analyzing.

The artificial intelligence module 11 is capable of receiving the configuration data 21 coming from the computer 2 of the vehicle 1 in order to generate a request for personalized audio content 22.

Optionally, the artificial intelligence module 11 comprises parameters 10 identifying a brand, a product or a company.

Again optionally, the artificial intelligence module 11 is capable of interrogating, via an information request 38, a server 18 of a geographical point of interest, for example a server of a theater, in order to obtain information 28 relating to said point of interest, for example the title of the most popular show of the schedule for the current year, in said theater.

In the optional case where the system 5 comprises a personal message function, the artificial intelligence module 11 is capable of receiving a request for broadcasting a specific audio content 27 from a connected electronic unit 17. The term "connected" is understood to mean "capable of being connected to the internet". A connected electronic unit 17 is for example a computer or a multifunction mobile device, such as a smart phone. A request for broadcasting a specific audio content 27 comprises, for example, a song title and/or a unique identifier associated with a specific audio content.

Depending on one or more sets of configuration data 21 and, optionally, on a request for broadcasting a specific audio content 27, on information 28 linked to a point of interest and/or on identifying parameters 10, the artificial intelligence module 11 is capable of generating a request for personalized audio content 22.

The artificial intelligence module 11 may be integrated into the vehicle 1 or else be remote. Preferably, the artificial intelligence module 11 is remote.

The compiler 12 is capable of receiving a request for personalized audio content 22 and of generating, depending on this request for personalized audio content 22, personalized audio content 29.

The compiler 12 may be integrated into the vehicle 1 or may be remote. Preferably, the compiler 12 is remote.

The compiler 12 is capable of interrogating one or more audio content suppliers 13, 14, 15, 16, via requests for audio contents 33, 34, 35, 36, in order to obtain one or more audio contents 23, 24, 25, 26. The compiler 12 is then capable of generating personalized audio content 29 by a simple transfer of audio content 23, 24, 25, 26 obtained from an audio content supplier 13, 14, 15, 16, or else by mixing or concatenating several audio contents 23, 24, 25, 26 obtained from one or more audio content suppliers 13, 14, 15, 16.

Audio content 23, 24, 25, 26 is classified according to various categories comprising the categories: music, information, audio book, sketch, ambiance, personal messages.

In FIG. 1, the audio content suppliers shown are:
- a musical audio content supplier 13, capable of supplying music category audio contents such as songs, instrumental pieces,
- an audio content supplier of ambiance sounds 14, capable of supplying ambiance category audio contents such as bell sounds, children shouting, sounds of a theater,
- an informative audio content supplier 15, capable of supplying information category audio contents such as articles, editorials, interviews, training materials,
- a personal message audio content supplier 16, capable of supplying personal message category audio contents, in particular vocal or musical messages recorded by persons or devices at the initiative of requests for broadcasting specific audio content 27.

May also be mentioned other suppliers of audio contents, not shown in FIG. 1, such as:
- an audio content supplier of sketches capable of supplying sketch category audio contents such as cult classic clips from cinema, from theater, extracts from comedy or drama shows
- an audio content supplier of audio books capable of supplying audio book category audio contents such as recordings of works originally published in written form, and read with one or more voices by one or more professional actors, by the author of the work, or less preferably by a voice synthesizer.

Several audio content suppliers 13, 14, 15, 16 may be grouped into a multi-category audio content supplier capable of supplying audio contents 23, 24, 25, 26 of various categories.

One or more characteristics are associated with a category of audio content allowing audio content 23, 24, 25, 26 to be characterized more precisely.

For the music category, a plurality of associated characteristics are identified comprising:
- a genre from, amongst other things, jazz, rock, classical, pop, variety, rap, disco, heavy metal
- a performer or a group of performers,
- a song or album title,
- musical descriptors such as an energy level, an instrumentality index, a musical mode, a popularity index, a tempo, a positivity index, an acoustic content, a spoken-sung index, a sound volume index, a dance nature index.

For the information category, a plurality of associated features are identified comprising:
- a topic from, amongst other things, sport, music, international information, culture,
- descriptors such as a popularity index, a positivity index.

For the audio book category, a plurality of associated characteristics are identified comprising:

a genre from, amongst other things, theater, novel, detective, suspense, an author, a book title, descriptors such as an energy level, a popularity index, a positivity index.

For the sketch category, a plurality of associated characteristics are identified comprising:

a type from, amongst other things, theater, cinema, show the genre from, amongst other things, comedy, comedy-drama, drama, horror, childhood, detective a producer, an actor or a group of actors a film title descriptors such as an energy level, a popularity index, a positivity index, a spoken/sung index.

For the ambiance category, a plurality of associated features are identified comprising:

a geographical point of interest type examples of which are given hereinafter, descriptors such as an energy level, a popularity.

The descriptors allow an audio content to be defined by specific characteristics. The list give hereinbelow is non-limiting.

With regard to the musical descriptors, definitions are given hereinbelow.

The energy level represents a perceptual measurement of the intensity and of the activity. An energetic audio content is generally noisy. For example, music of the heavy metal genre has a high energy level. A musical prelude of the classical genre has a low energy level.

The instrumentality index represents an amount of instrumental content with respect to the vocal content in an audio content. Music of the rap genre has a low instrumentality index. Instrumental music with neither singing nor lyrics has a maximum instrumentality index.

The musical mode indicates whether the audio content is in a major or minor key, according to the definition given in music theory.

The popularity mainly represents the number of broadcasts of an audio content and may also correlate this number according to the dates of these broadcasts.

The tempo represents the speed or the rhythm of an audio content.

The positivity index represents the musical positivity transmitted by an audio content. A high positivity index corresponds to a merry, happy, euphoric audio content, whereas a low positivity index corresponds to a sad, depressing, audio content inspiring or expressing anger.

The acoustic content indicates whether an audio content is composed of acoustic instruments or otherwise.

The spoken-sung index indicates the presence of spoken words with respect to the sung words in an audio content. A music category audio content of the rap genre has a higher spoken-sung index than a music category audio content of the disco genre.

The sound volume index represents an average value of volume on all the audio content.

The dance nature index represents to what extent an audio content is suitable for dancing by furthermore combining the tempo, the stability of the rhythm and the general regularity.

The descriptors of the audio contents of the other categories relate to similar representations or indications, transposed for the corresponding categories.

For the personal message category, at least one associated characteristic is identified such as a unique identifier associated with a specific audio content.

A request for personalized audio content 22 comprises a plurality of fields.

Advantageously, the plurality of fields comprises a category of audio content, at least one associated characteristic, and optionally a duration.

For example, in the case of an information or sketch category audio content, it is advantageous to indicate the desired duration of the audio content so that the duration of the broadcast of the personalized audio content 29 is in phase with the contextual situation of which the configuration data 21 are the reflection, such as a traffic jam.

A request for personalized audio content 22 may comprise several categories of audio contents, each category being associated with at least one characteristic.

The various fields of the request for personalized audio content 22 thus finely characterize the personalized audio content 29 to be broadcast in the cab 2 of the vehicle 1.

The artificial intelligence module 11 generates the request for personalized audio content 22, according to the configuration parameters 21 sent by the computer 2.

The configuration parameters 21 comprise:

contextual data comprising a geographical point of interest, the weather, the road traffic, the landscape, the time of day, passenger data comprising user preferences, the state of the driver, the mood of the driver, the age and the gender (male/female) of a passenger, the tastes of the passengers, vehicle data comprising the speed of the vehicle.

The contextual data comprise environmental data and temporal data. They are extrinsic to the vehicle 1.

The passenger data are directly associated with the passenger or passengers of the vehicle. The passenger data reflect emotional states of the passenger or passengers. The passenger data comprise personal data such as the age and the gender (male/female) of a passenger. The passenger data also comprise, via the user preferences, preferences chosen by a user which orient the choice of the personalized audio contents 29 disallowing certain audio contents. The tastes of the passengers reflect the audio preferences of all the passengers of the vehicle. This allows the artificial intelligence module 11 to generate requests for personalized content 22 in phase with the tastes of all the users of the vehicle 1, the personalized audio contents 29 being broadcast within the cab 4 of the vehicle where all the passengers are located. In one embodiment of broadcast in sound bubbles inside the cab 4 of the vehicle, the system 5 can generate as many personalized audio contents 29 as there are passengers, according to the tastes of each passenger, the broadcast of each personalized audio content 29 being individualized.

The vehicle data are intrinsic to the vehicle such as data flowing on the CAN bus of the vehicle. These are data coming from sensors integrated into the vehicle.

For the weather, a plurality of types are identified from, amongst other things, storm, rain, sun.

For the road traffic, a plurality of types are identified from, amongst other things, flowing, slow and saturated. The saturated type corresponds to a complete backup of the traffic.

For the landscape, a plurality of types are identified from, amongst other things, urban, countryside, forested/wooded, and vegetation, the vegetation type relating to a level of green color in an image of a vehicle environment taken by a camera integrated into the vehicle 1.

For the time of day, a plurality of types are identified from, amongst other things, morning, evening, mi-midday, afternoon, sunrise, sunset, day, night.

For the state of the driver, a plurality of types are identified from, amongst other things, tired, irritated, stressed.

For the mood of the driver, a plurality of types are identified from, amongst other things, happy, sad.

For the speed of the vehicle, a plurality of types are identified from amongst fast, slow, speeding. The speeding type corresponds to a vehicle speed higher than the maximum speed allowed by the law.

The user preferences allow a passenger to define preferences on one or more categories of audio content and on the mixing together of the audio contents 23, 24, 25, 26. For example, a passenger may define a preference for the jazz genre music category and may disallow the information category audio contents 25 together with the mixing with ambiance category audio contents 24.

The user preferences also allow a passenger to inhibit the inclusion of certain configuration parameters 21 by the artificial intelligence module 11 or to inhibit the personal message function for example depending on the person or on the device who or which has initiated the request for broadcasting a specific audio content 27.

The artificial intelligence module 11 generates the request for personalized audio content 22, according to the configuration parameters 21 sent by the computer 2 of the vehicle. In accordance with the request for personalized audio content 22, the compiler 12 generates personalized audio content 29 and sends it to the computer 2 of the vehicle 1 for broadcasting within the cab 4 of the vehicle 1. Thus, personalized and contextual audio contents are broadcast to the passengers of the vehicle 1, in harmony with the external environment and the passengers.

The examples hereinbelow, which are non-limiting, illustrate the influence of the configuration parameters 21 on a request for personalized audio content 22 comprising the music category.

Advantageously, contextual weather data have an influence on the musical descriptors for energy level, for dance nature index, for positivity index, for musical mode, for sound volume index, thus allowing a broadcast of personalized audio content 29 of a musical color in harmony with the color of the sky. A high positivity index corresponds to a sun type of weather, a major key mode, a high dance nature index and a high energy level index. A low positivity index corresponds to a rain type of weather, a minor key mode, a low dance nature index and a low energy level index. In the case of weather contextual data of the storm type, the sound volume index is increased.

Advantageously, time of day contextual data has an influence on the musical descriptor for acoustic content, for positivity index, for musical mode and for energy level. For a time of day of the sunrise type, the personalized audio content 29 generated is advantageously increasingly energetic and positive as the brightness increases, and preferably in major key mode. For a time of day of the sunset type, the personalized audio content 29 generated is advantageously less and less energetic and positive as the brightness decreases, and preferably in minor key mode.

Advantageously, landscape contextual data has an influence on the musical descriptors for acoustic content, for tempo and for instrumentality index, allowing personalized audio contents 29, typically acoustic and instrumental and with slow tempo, for a landscape of the vegetation type, where the musical descriptors may be adjusted as the amount of green color varies in the image of the vehicle environment taken by the camera integrated into the vehicle 1. It is also relevant to change the genre of an audio content of the music type when there is a clear change of landscape.

Advantageously, speed vehicle data has an influence on the energy level and tempo musical descriptors. For a speed of the fast type, the personalized audio content 29 generated is advantageously energetic and of quick tempo. For a speed of the slow type, the personalized audio content 29 generated is advantageously of low energy and of slow tempo.

Advantageously, mood passenger data for the driver has an influence on the musical descriptor for positivity index. Depending on the user preferences, merry or sad personalized audio content 29 may be in phase with mood passenger data of the sad type. A sad passenger may wish to hear audio contents in phase with his/her state or else, on the contrary, merry audio contents in order to help him/her get back into a merry state. For mood passenger data of the merry type, it is typically a merry audio content which corresponds.

Advantageously, the artificial intelligence module 11 prioritizes the configuration data 21 when it leads to an incompatibility in choice of the fields of the personalized content request 22.

It may also be envisioned to associate with a combination of configuration data 21 rules for impact on the descriptors. For example, the contextual data on weather and the passenger data on mood of the driver may be advantageously combined.

According to one non-limiting example, a request for personalized audio content 22 comprises the category information when the configuration data 21 comprise contextual data comprising a time of day of the morning, midday or evening type. Over the typical time periods from 7 h to 9 h, from 12 h to 13 h and from 19 h to 20 h30, it is appropriate to broadcast personalized audio contents 29 such as editorials relating to the news.

When the various devices of the system 5 are not accommodated close to one another, in particular when they are not integrated into the vehicle 1 in such a manner that it is possible to connect them together via a wired connection, the communication by data exchanges is carried out via a wireless link known from the prior art, such as a 3G, 4G or 5G cellular network. For example, a radio wave technology such as provided by the WiMAX (acronym for Worldwide Interoperability for Microwave Access) communications standard is appropriate for communications between the audio content suppliers 13, 14, 15, 16 and the compiler 12.

Figure 2:
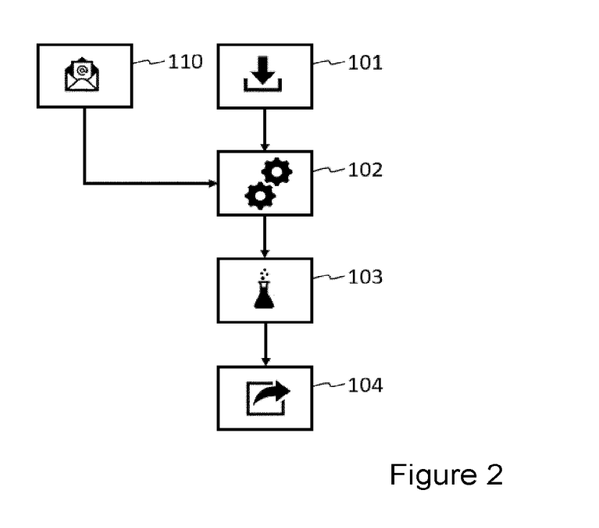
FIG. 2 illustrates the steps of a method for delivering personalized audio content according to the invention.

FIG. 2 illustrates the steps of a method for delivering personalized audio content according to the invention.

According to a configuration step 101, the computer 2 sends to the artificial intelligence module 11 configuration parameters 21 which comprise vehicle data, passenger data and contextual data.

According to a processing step 102, the artificial intelligence module 11 sends to the compiler 12 a request for personalized audio content 22 on the basis of at least one configuration parameter 21. The request for personalized audio content 22 comprises at least one category of audio content.

According to a step for generating an audio content 103, the compiler 12 interrogates an audio content supplier 13, 14, 15, 16 in order to obtain an audio content 23, 24, 25, 26 allowing personalized audio content 29 to be generated corresponding to the request for personalized audio content 22.

Advantageously, an audio content supplier 23, 24, 25, 26 is capable of receiving requests for audio contents 33, 34, 35, 36 comprising the characteristics associated with their category, in particular the descriptors.

According to a step for delivering audio content 104, the compiler 12 sends the personalized audio content 29 to the computer 2 for broadcasting within the cab 4 of the vehicle 1.

According to a personal message function, the method furthermore comprises a step for receiving a specific broadcast request 110, in which the artificial intelligence module 11 receives a request for broadcasting a specific audio content 27.

This personal message function allows a person or a device to send a request for specific audio content 27 to the system 5 for broadcasting said specific audio content within the cab 4 of the vehicle 1.

Preferably, the request for specific audio content 27 is sent directly to the artificial intelligence module 11, but it may be envisioned for the request for specific audio content 27 to be sent to the computer 2 of the vehicle 1 which subsequently re-transmits it to the artificial intelligence module 11.

For example, a person wishes to send a song dedicated to a user of the vehicle 1, on the occasion of his/her birthday. The person logs on, via his/her smart phone which is a connected electronic unit 17, to an application dedicated to the personal message function, records via his/her telephone a personalized message and choses from the musical audio content supplier 13 a song to accompany the personalized message. The person validates the choice of the song and of the personalized message on the dedicated application. The personalized message is sent to the supplier of personal message contents who stores it, assigns to it a unique identifier and sends this unique identifier to the telephone.

A request for broadcasting a specific audio content 27 is sent to the artificial intelligence module 11 which receives it according to a step for receiving a specific broadcast request 110.

The request for broadcasting a specific audio content 27 comprises the title and the performer of the chosen song, together with the unique identifier corresponding to the personalized message.

If the user of the vehicle 1 is a passenger of the vehicle 1, for example because he/she is driving said vehicle 1, the artificial intelligence module 11 sends to the compiler 12, on the basis of at least one configuration parameter 21, for example the passenger data, preferably user, which enables the personal message function, a request for personalized audio content 22, according to the processing step 102. In order to reflect the request for broadcasting a specific audio content 27, the request for personalized audio content 22, comprises fields which are:
- the personal message category and the associated characteristic with a unique identifier,
- the music category and the associated characteristics of title and of performer of the song.

According to the step for generating audio content 103, the compiler 12 interrogates the supplier of personal message contents 16 in order to obtain, according to the unique identifier, the personalized message. The compiler 12 interrogates the musical audio content supplier 13 so as to obtain the song associated with the personalized message. The compiler 12 concatenates the personalized message and the song in order to generate the personalized audio content 29.

The compiler 12 subsequently sends the personalized audio content 29 to the computer 2 for broadcasting within the cab 4 of the vehicle 1, according to the step for delivering audio content 104.

The generation of the request for personalized audio content 22 may be delayed with respect to the receipt of the request for broadcasting a specific audio content 27, if the user of the vehicle 1 is not a passenger of the vehicle 1 at the time of said receipt of the request for broadcasting a specific audio content 27, or as a function of the configuration parameters 21 or again according to the content of the request for broadcasting a specific audio content 27.

For example, the request for broadcasting a specific audio content 27 may also comprise a broadcast timetable chosen by the person or the device initiating said request for broadcasting a specific audio content 27. Such a choice of broadcast timetable is made for example via the application dedicated to the personal message function at the time of the validation of the specific audio content 27. The specific audio content 27 will then be broadcast according to the specified timetable, with the condition that the vehicle user 1 is a passenger of the vehicle 1 at the specified time.

According to another example, the request for broadcasting a specific audio content 27 may furthermore comprise a geographical position of the vehicle 1 for the broadcast, chosen by the person or the device initiating said request for broadcasting a specific audio content 27. Such a choice of geographical position is made for example via the application dedicated to the personal message function at the time of the validation of the specific audio content 27. The specific audio content 27 will then be broadcast when the vehicle 1 is located at the specified geographical position.

Advantageously, the configuration parameters 21 comprise contextual data comprising a geographical point of interest.

A geographical point of interest is detected by the vehicle 1 via its geographical position, for example by means of data extracted from a digital map accessible by the computer 2, or by a camera integrated into the vehicle 1.

A point of interest is classified by type. Several types are identified from, amongst other things, notably a school, a church, a museum, a theater, a historical monument, a hotel, a country mansion, a sports stadium, a gymnasium, a theater, a city hall, a music or dance school, an opera, a park, a forest, a stream, a river, a water course, an ocean, a sea, a port, a traffic infrastructure such as a tunnel, a bridge, a road junction, a radar, an iconic highway, etc.

The compiler 12 is capable of mixing an extract from an audio content, typically of an ambiance category or, more generally, of any given category evoking a point of interest, or of mixing said audio content in its entirety with another audio content, from a different category or from the same category, in order to generate an audio content said to be of the enhanced type, with a view to sending it as personalized audio content 29 to the computer 2, according to a first variant embodiment.

The compiler 12 is also capable of sending an extract from an audio content, typically of an ambiance category or, more generally, of any given category evoking a point of interest, or of sending said audio content in its entirety, directly as personalized audio content 29 to the computer 2, without mixing it with another audio content, according to a second variant embodiment.

The choice to send personalized audio content 29 generated according to the first variant or according to the second variant is preferably left to the compiler 12. It is however possible to leave this choice to the artificial intelligence module 11 which transmits it to the compiler 12 via the request for personalized audio content 22, through a dedicated field. The choice of variant embodiment is determined notably according to the passenger data and, more particularly, to user preferences, but also to a history of the personalized audio contents already broadcast within the cab 4 of the vehicle 1.

Also, the artificial intelligence module 11 may not take into account geographical point of interest contextual data, depending on the passenger data, other contextual data or vehicle data. For example, a passenger may, through user preferences, indicate that he/she does not want personalized audio contents 29 taking into account points of interest to be broadcast. According to another example, in the case where one of the configuration parameters 21 is considered to have a higher priority than the point of interest, the artificial intelligence module 11 generates the request for personalized audio content 22 on the basis of said configuration parameter 21 having a higher priority than the point of interest.

According to a first embodiment, after receiving contextual data comprising a geographical point of interest, the artificial intelligence module 11 generates a request for personalized audio content 22 comprising at least one category of audio content and the type of the point of interest. In the step for generating audio content 103, the compiler 12 interrogates an audio content supplier 13, 14, 15, 16 of the category corresponding to the request for personalized audio content 22, in order to obtain an audio content 23, 24, 25, 26 of said category, evoking the point of interest. Subsequently, according to the variant embodiment, the audio content obtained 23, 24, 25, 26 is mixed or not with another audio content by the compiler 12 so as to generate personalized audio content 29.

According to a second embodiment, after receiving contextual data comprising a point of interest, the artificial intelligence module 11 interrogates a server 18 of said point of interest in order to obtain information 28 on said point of interest, in order to generate a request for personalized audio content 22 based on said information 28. The request for personalized audio content 22 is subsequently sent to the compiler 12 which, depending on the content of the request for personalized audio content 22, interrogates an audio content supplier in order to obtain an audio content 23, 24, 25, 26 in phase with said request for personalized audio content 22. Subsequently, according to the variant embodiment, the audio content obtained 23, 24, 25, 26 is mixed or not with another audio content by the compiler 12 so as to generate personalized audio content 29.

The processing step 102 according to the second embodiment differs from the first embodiment in that the artificial intelligence module 11 interrogates a server 18 of the point of interest in order to obtain information 28 on the point of interest, so as to generate a request for personalized audio content 22 in relation with said information 28 on the point of interest.

According to one example and conforming to the first embodiment, when the vehicle 1 approaches a school, the computer 2 sends configuration parameters 21 to the artificial intelligence module 11, according to the configuration step 101. The configuration parameters 21 comprise contextual data comprising a geographical point of interest of the school type.

The artificial intelligence module 11 generates a request for personalized audio content 22 comprising the ambiance category and the school type, according to the processing step 102.

According to the step for generating audio content 103, the compiler 12 interrogates a supplier of ambiance sounds contents 14 in order to obtain an audio content of the ambiance category 24, evoking a school, for example children shouting and laughing.

According to the first variant, the audio content of the ambiance category 24 is mixed with an audio content, for example the personalized audio content complying with the preceding request for personalized audio content, and which is for example an audio content of the music category, thus generating personalized audio content 29 of the enhanced type, complying with the latest request for personalized audio content 22. According to the step for delivering an audio content 104, the compiler 12 sends the personalized audio content 29 of the enhanced type to the computer 2 for broadcasting within the cab 4 of the vehicle 1. As the personalized audio content 29 of the enhanced type is broadcast, the driver of the vehicle 1 notices that he/she is passing near to a school. The driver is then totally immersed in the environment of the vehicle 1. Moreover, the driver is subtly alerted to a potential danger associated with the possible presence of children in the environment close to the vehicle 1.

According to the second variant, the audio content of the ambiance category 24 is directly sent as personalized audio content 29 to the computer 2, without mixing with another audio content, according to the step for delivering an audio content 104.

According to another example and conforming to the second embodiment, the vehicle 1 approaches a theater. The computer 2 sends configuration parameters 21 to the artificial intelligence module 11 according to the configuration step 101. The configuration parameters 21 comprise contextual data comprising a geographical point of interest of the theater type.

According to the processing step 102, the artificial intelligence module 11 interrogates a server 18 of the theater in order to obtain information 28 on the theater, so as to generate a request for personalized audio content 22, in relation with said information 28 on the theater. For example, the artificial intelligence module 11 interrogates the server 18 of the theater on the next concert scheduled in said theater. The information 28 obtained in response to the interrogation of the server 18 comprises an artist and an album title. The artificial intelligence module 11 generates a request for personalized audio content 22 comprising the music category, together with associated characteristics comprising the name of the artist and the title of the album sent by the server 18.

According to the step for generating audio content 103, the compiler 12 interrogates a supplier of musical audio contents 13 in order to obtain an audio content of the music category 23, in particular the audio content corresponding to the song relating to the name of the artist and to the title of the album.

According to the first variant, an extract of the audio content corresponding to the song relating to the artist and to the title of the album is mixed with another audio content, for example with the personalized audio content complying with the request for personalized audio content, thus generating personalized audio content 29 of the enhanced type complying with the latest request for personalized audio content 22. According to the step for delivering an audio content 104, the compiler 12 sends the personalized audio content 29 of the enhanced type to the computer 2 for broadcasting within the cab 4 of the vehicle 1. The driver of the vehicle 1, upon listening to the personalized audio content of the enhanced type, notices that he/she is passing near to a concert hall. The driver is then totally immersed in the environment. Moreover, the driver is informed of the next item in the program of the theater located close to the vehicle 1.

According to the second variant, the musical audio content 23 corresponding to the song relating to the name of the artist and to the title of the album is directly sent as personalized audio content 29 to the computer 2, without mixing with another audio content, according to the step for delivering an audio content 104.

The first and second embodiments, and also the first and second variants may be applied to configuration data other than contextual data for a geographical point of interest, for example to weather contextual data. When there is a forecast for a change of weather to stormy weather, the compiler 12 may send enhanced personalized audio content 29 mixing a noise of thunder with another audio content, upon receiving a request for personalized audio content 22 generated using weather contextual data of the storm type.

According to one example applied to vehicle data, the compiler 12 may send enhanced personalized audio content 29 mixing a sports car engine noise with another audio content, upon receiving a request for personalized audio content 22 generated using speed vehicle data of the fast type, the fast type corresponding for example to an excess of speed of the vehicle 1 with respect to a predetermined speed threshold.

According to one example applied to passenger data, the compiler 12 may send enhanced personalized audio content 29 mixing an extract of a song whose lyrics that relate to waking up, for example the song "Paris s'éveille (Paris is waking up)" sung by Jacques Dutronc, with another audio content, upon receiving a request for personalized audio content 22 generated using passenger data comprising the state of the driver associated with the tiredness type. A sign of tiredness is for example detected by the computer 2 by means of a camera disposed in the cab 4 of the vehicle.

Advantageously, the configuration parameters 21 comprise contextual data comprising the road traffic.

When a slowing is detected by the vehicle 1, appropriate configuration data 21 are sent to the artificial intelligence module 11.

Advantageously, contextual data comprising the road traffic, the slow type, together with a probable duration of the slowing are sent to the artificial intelligence module 11.

According to one exemplary embodiment, if the probable duration of the slowing is longer than a predefined threshold, for example five minutes, the artificial intelligence module sends a request for personalized content comprising the information or audio book category and the probable duration of the slowing.

If the probable duration of the slowing is shorter than or equal to the predefined threshold, the artificial intelligence module sends a request for personalized content 22 comprising the sketch category, the comedy genre and a very high positivity index descriptor. This allows the ambiance within the cab 4 of the vehicle 1 to be relaxed in a stressful situation such as a slowing of road traffic.

In order to avoid a systematic broadcast of an audio content of the information or audio book category in the case of a situation of slow traffic, the artificial intelligence module 11 may advantageously take into account a history of the requests for personalized content 22 already sent and adapt the content of the request for personalized content 22 in order to avoid a routine that may irritate the passenger or passengers of the vehicle 1.

In order to give a general musical color to the personalized audio contents 29 generated by the compiler 12, representative of or evoking a brand, a product or a company, the artificial intelligence module 11 comprises parameters 10 identifying a brand, a product or a company which it takes into account for generating the requests for personalized audio content 22.

The musical color of a personalized audio content 29 evokes with imagery the character of said personalized audio content 29. The musical color of a personalized audio content 29 corresponds to the sensations or the impressions communicated to the passenger of the vehicle 1 during the broadcast of the personalized audio content 29 within the cab 4 of the vehicle 1. Thus, the musical color of a personalized audio content 29 may be dark, bright, melancholic, nostalgic, said musical color being evoked by an instrumental timber, a way of playing, a musical genre, an artistic world.

For example, in the case of parameters 10 identifying a brand wishing to modernize, the artificial intelligence module 11 generates requests for personalized audio contents 22 comprising the music category and associated musical descriptors relating to modern music played by electric or electro-acoustic instruments.

According to another example, in the case of parameters 10 identifying a legendary brand, the artificial intelligence module 11 generates requests for personalized audio content 22 comprising the music category and associated musical descriptors relating to instrumental music played by noble acoustic instruments such as stringed instruments played with a bow.

According to another example, in the case of parameters 10 identifying a sports car brand, the artificial intelligence module 11 generates requests for personalized audio contents 22 comprising the music category and associated musical descriptors relating to recent, dynamic music in a major key.

Depending on the configuration data 21 or on a history of the requests for personalized audio contents 22 previously generated, the artificial intelligence module 11 takes into account the parameters 10 identifying the brand, the product or the company so as to generate any requests for personalized audio contents 22 to come, or only periodically, according to a predefined sequence for example at each start-up of the vehicle 1 or as a function of configuration data 21 such as user preferences.

The parameters 10 identifying the brand, the product or the company may be modified by an administrator of the artificial intelligence module depending for example on an advertizing campaign or on the news such as a sports event. The default identifying parameters 10 are advantageously those of the automobile manufacturer of the vehicle 1.

Depending on the parameters 10 identifying the brand, the product or the company, the artificial intelligence module 11 may also send a request for personalized audio contents 22 whose fields allow the compiler 12 to obtain from an audio content supplier, then to send to the computer 2, personalized audio content 29 corresponding to a jingle of the brand, of the product or of the company. A jingle may thus be broadcast to a passenger of the vehicle 1 periodically, at each start or end of a driving session or according to a predefined sequence.

A personalized audio content 29 comprises audio data.

The computer 2 is capable of analyzing personalized audio content 29 fin order to generate broadcast parameters for the broadcast of the personalized audio content 29 within the cab 4 of the vehicle 1.

According to one exemplary embodiment, the personalized audio content 29 furthermore comprises metadata. The computer 2 decodes and analyzes these metadata in order to generate broadcast parameters as a function of the metadata.

According to another exemplary embodiment, the computer analyzes directly the audio data in order to identify characteristics such as the category of the audio content or associated characteristics such as the title, the performer, so as to generate broadcast parameters as a function of said characteristics of the audio content.

The broadcast parameters allow the broadcast of the personalized audio content 29 to be sublimated in the cab 4 of the vehicle 1, for example by reproducing the acoustic signature of an environment such as a theater, a church, by giving the illusion to a passenger of the cab 4 of being placed in another acoustic space.

The broadcast parameters comprise a correction of the audio timber, also referred to as sound equalization, sound spatialization, audio dynamic compression.

The correction of the audio timber allows various frequency bands composing an audio signal associated with a broadcast of audio content to be filtered or amplified.

The sound spatialization allows an auditory space to be reproduced in three dimensions by convoluting the measured acoustic fingerprint of a location with the musical signal. The spatialization participates in the sensation of immersion.

The audio dynamic compression allows the difference in levels between the loudest and quietest sounds to be reduced by increasing the quiet sounds while at the same time decreasing the loud sounds.

The broadcast of the personalized audio content 29 is advantageously carried out according to the broadcast parameters thus generated.

Preferably, the compiler 12 is capable of generating a succession of personalized audio contents 29 on the basis of a request for personalized audio content 22, starting from a plurality of audio contents 23, 24, 25, 26 generated according to a nearest-neighbor search method, and until it receives a new request for personalized audio content 22.

Advantageously, it is the audio content supplier 13, 14, 15, 16 that is capable of implementing a nearest-neighbor search algorithm, allowing the supply to the compiler 12 of a plurality of audio contents 23, 24, 25, 26, thus making said compiler 12 capable of generating a succession of personalized audio contents 29.

According to a nearest-neighbor search algorithm, starting from a given audio content or from characteristics such as descriptors, an audio content supplier 13, 14, 15, 16 is able to find, other audio contents, neighboring audio contents being characterized as all having a similar musical universe, theme or else musical color.

Advantageously, the system 5 comprises a learning module. The learning module is preferably integrated into the artificial intelligence module 11. Depending on the behavior of the passenger or passengers, the system 5 adapts the personalized audio contents 29 to be broadcast within the cab 4 of the vehicle 1. The behavior of the passenger or passengers is detected by a camera integrated into the vehicle or via a human-machine interface allowing a passenger to send a satisfaction feedback on the personalized audio contents 29 broadcast within the cab 4 of the vehicle 1.

In the case of the learning module integrated into the artificial intelligence module 11, the computer 2 is capable of sending satisfaction or behavior data to the artificial intelligence module 11.

The artificial intelligence module 11 is capable of taking into account these satisfaction or behavior data in order to modify the requests for personalized contents 22, the requests or personalized contents 22 being generated according to the configuration data 21 and to the satisfaction or behavior data.

The invention claimed is:

1. A method for delivering personalized audio content in a cab of a vehicle to a passenger, the vehicle comprising a computer, the method comprising:
    sending, by the computer, configuration parameters to processing circuitry, the configuration parameters comprising vehicle data, passenger data and contextual data;
    processing, in which the processing circuitry generates, using artificial intelligence, a request for personalized audio content including at least one category of audio content and a characteristic of the at least one category of audio content based on at least one configuration parameter and sends to compiler circuitry the request for personalized audio content;
    generating, by the compiler circuitry, audio content by interrogating an audio content supplier to obtain audio content enabling the personalized audio content to be generated in accordance with the request for personalized audio content; and
    sending, by the compiler circuitry, the personalized audio content to the computer for broadcasting said personalized audio content within the cab of the vehicle, wherein
    the method further comprises mixing, by the compiler circuitry, an extract of audio content relating to a point of interest, or mixing the audio content relating to the point of interest, in its entirety, with another audio content, so as to generate audio content of an enhanced type.

2. The method as claimed in claim 1, wherein the contextual data comprises geographical points of interest and the method further comprises interrogating, by the processing circuitry, a server of a point of interest to obtain information on the point of interest, so as to generate the request for personalized audio content relating to said information on the point of interest.

3. The method as claimed in claim 2, wherein the geographical points of interest include a geographical position of the vehicle.

4. The method as claimed in claim 1, wherein the contextual data comprises geographical points of interest, and the method further comprises sending, by the compiler circuitry, the audio content of the enhanced type as the personalized audio content to the computer.

5. The method as claimed in claim 1, further comprising generating, by the processing circuitry, the request for personalized audio content in phase with parameters corresponding to an identity of a brand, a product, or a company.

6. The method as claimed in claim 1, further comprising:
    receiving, by the processing circuitry, a specific broadcast request for broadcasting a specific audio content,
    wherein the processing includes the processing circuitry sending to the compiler circuitry the request for personalized audio content depending on the specific broadcast request.

7. The method as claimed in claim 1, further comprising:
    interrogating, by the compiler circuitry, one or more audio content suppliers to obtain several audio contents; and
    generating, by the compiler circuitry, the personalized audio content by mixing or concatenating the several audio contents.

8. The method as claimed in claim 1, further comprising generating, by the compiler circuitry, a succession of personalized audio contents in accordance with the request for personalized audio content, starting from a plurality of audio contents generated according to a nearest-neighbor search method, until the compiler circuitry receives a new request for personalized audio content.

9. The method as claimed in claim 1, further comprising analyzing, by the computer, the personalized audio content to generate broadcast parameters, the broadcast parameters comprising one or more from at least a correction of audio timbre, a sound spatialization, and an audio dynamic compression, a broadcast of the personalized audio content within the cab of the vehicle being carried out according to said broadcast parameters.

10. The method as claimed in claim 1, wherein the vehicle data includes a speed of the vehicle.

11. The method as claimed in claim 1, wherein the characteristic of the at least one category of audio content includes a genre of the at least one category of audio content.

12. The method as claimed in claim 1, wherein the request for personalized audio content further comprises a duration of audio content.

13. A system for delivering personalized audio content in a cab of a vehicle to a passenger, the system comprising:
   a computer of the vehicle configured to send configuration parameters comprising vehicle data, passenger data, and contextual data, and configured to receive personalized audio content for broadcasting said personalized audio content within the cab of the vehicle;
   processing circuitry configured to receive the configuration parameters, generate, using artificial intelligence, a request for personalized audio content including at least one category of audio content and a characteristic of the at least one category of audio content based on at least one configuration parameter, and send the request for personalized audio content; and
   compiler circuitry configured to receive the request for personalized audio content and configured to interrogate an audio content supplier to obtain audio content allowing the personalized audio content to be generated in accordance with the request for personalized audio content, the compiler circuitry being furthermore configured to send the personalized audio content to the computer, wherein
   the compiler circuitry is configured to mix an extract of audio content relating to a point of interest, or configured to mix the audio content relating to the point of interest, in its entirety, with another audio content, so as to generate audio content of an enhanced type.

14. A non-transitory computer-readable storage medium for storing computer-readable instructions that, when executed by a computer, cause the computer to perform a method, the method comprising:
   receiving, from a remote computer of a cab of a vehicle, configuration parameters comprising vehicle data, passenger data and contextual data;
   generating, using artificial intelligence, a request for personalized audio content including at least one category of audio content and a characteristic of the at least one category of audio content based on at least one configuration parameter; and
   sending to compiler circuitry the request for personalized audio content, the compiler circuitry being configured to mix an extract of audio content relating to a point of interest, or mix the audio content relating to the point of interest, in its entirety, with another audio content, so as to generate audio content of an enhanced type.

* * * * *